United States Patent [19]
Takase

[11] 4,452,512
[45] Jun. 5, 1984

[54] WIDE ANGLE ZOOM LENS SYSTEM

[75] Inventor: Hiroshi Takase, Hachioji, Japan

[73] Assignee: Olympus Optical Co., Ltd., Tokyo, Japan

[21] Appl. No.: 505,891

[22] Filed: Jun. 20, 1983

Related U.S. Application Data

[63] Continuation of Ser. No. 187,448, Sep. 15, 1980, abandoned.

[30] Foreign Application Priority Data

Sep. 18, 1979 [JP] Japan .................. 54-119830

[51] Int. Cl.³ .............................. G02B 13/04
[52] U.S. Cl. ........................ 350/426; 350/423
[58] Field of Search ............ 350/426, 423, 427, 429

[56] References Cited

U.S. PATENT DOCUMENTS 4,074,931 2/1978 Okudaira .................. 350/426
4,323,302 4/1982 Kimura .................... 350/426

Primary Examiner—John K. Corbin
Assistant Examiner—P. M. Dzierzynski
Attorney, Agent, or Firm—Cushman, Darby & Cushman

[57] ABSTRACT

A wide-angle zoom lens system comprising a front lens group consisting of a first negative meniscus lens component, a second negative lens component and a third positive lens component, and a rear lens group consisting of a fourth positive lens component, a fifth positive meniscus lens component, a sixth negative lens component and a seventh positive lens component. Said zoom lens system is so adapted as to perform the zooming operation by varying the airspace reserved between said front and rear lens groups.

6 Claims, 19 Drawing Figures

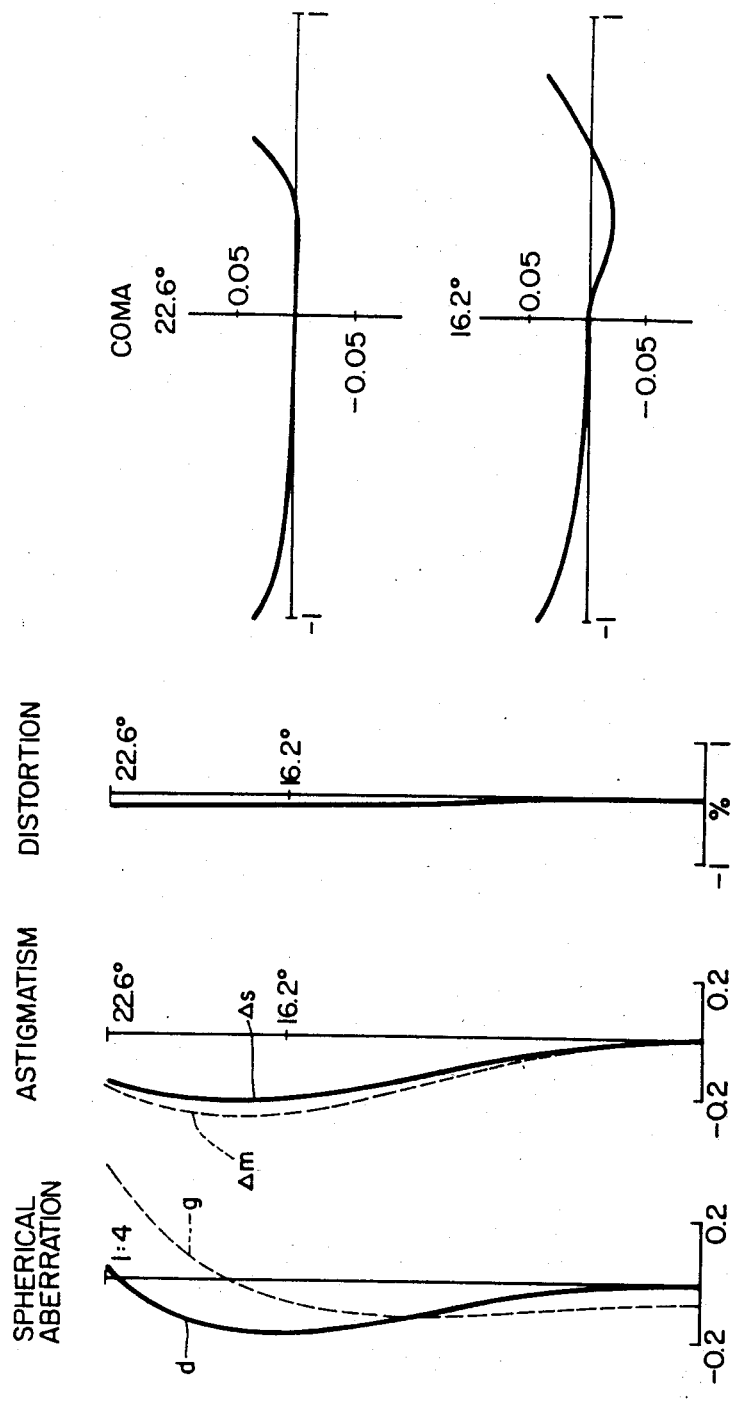

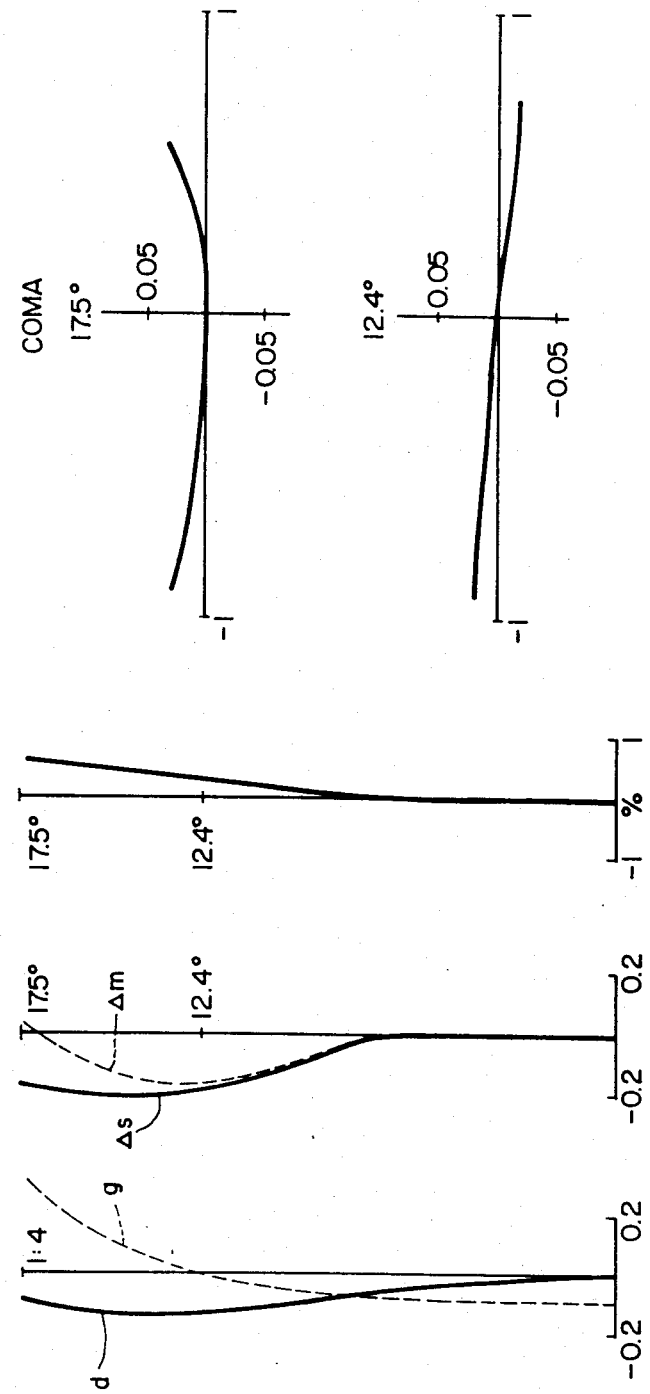

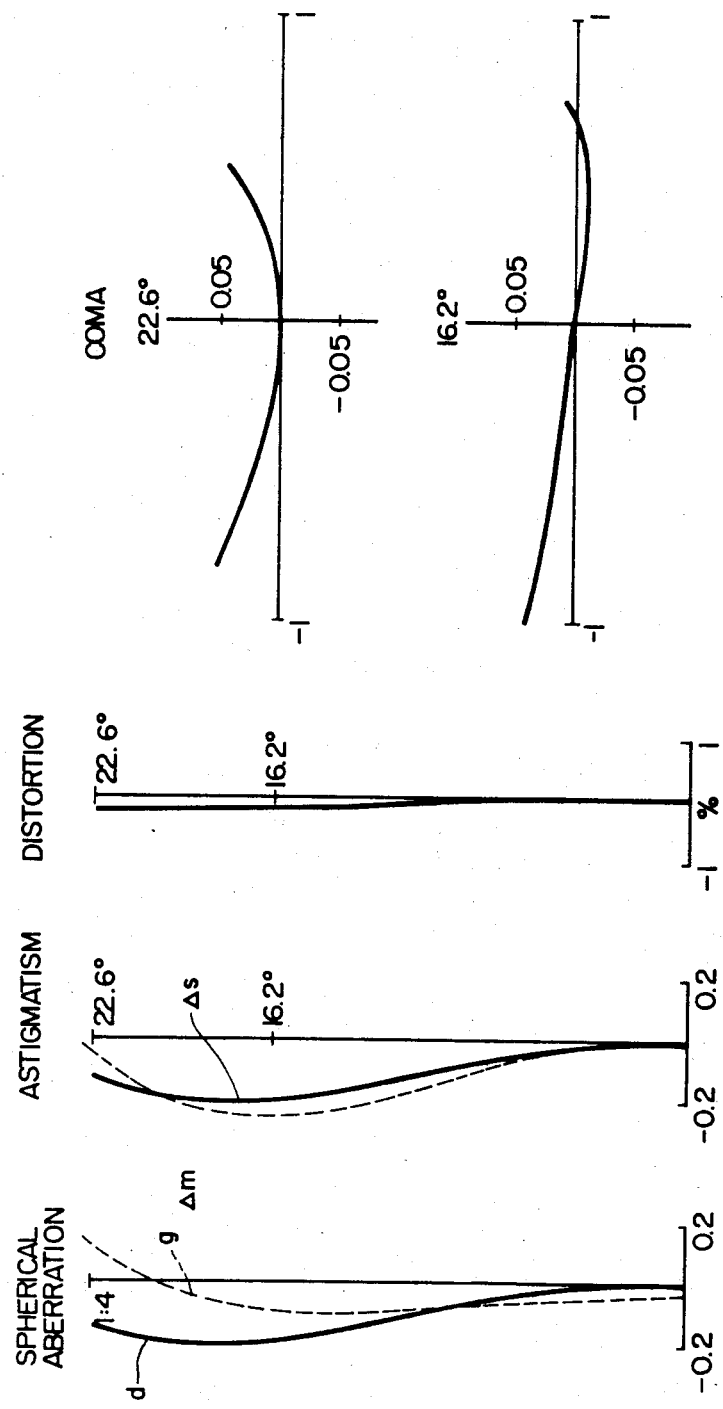

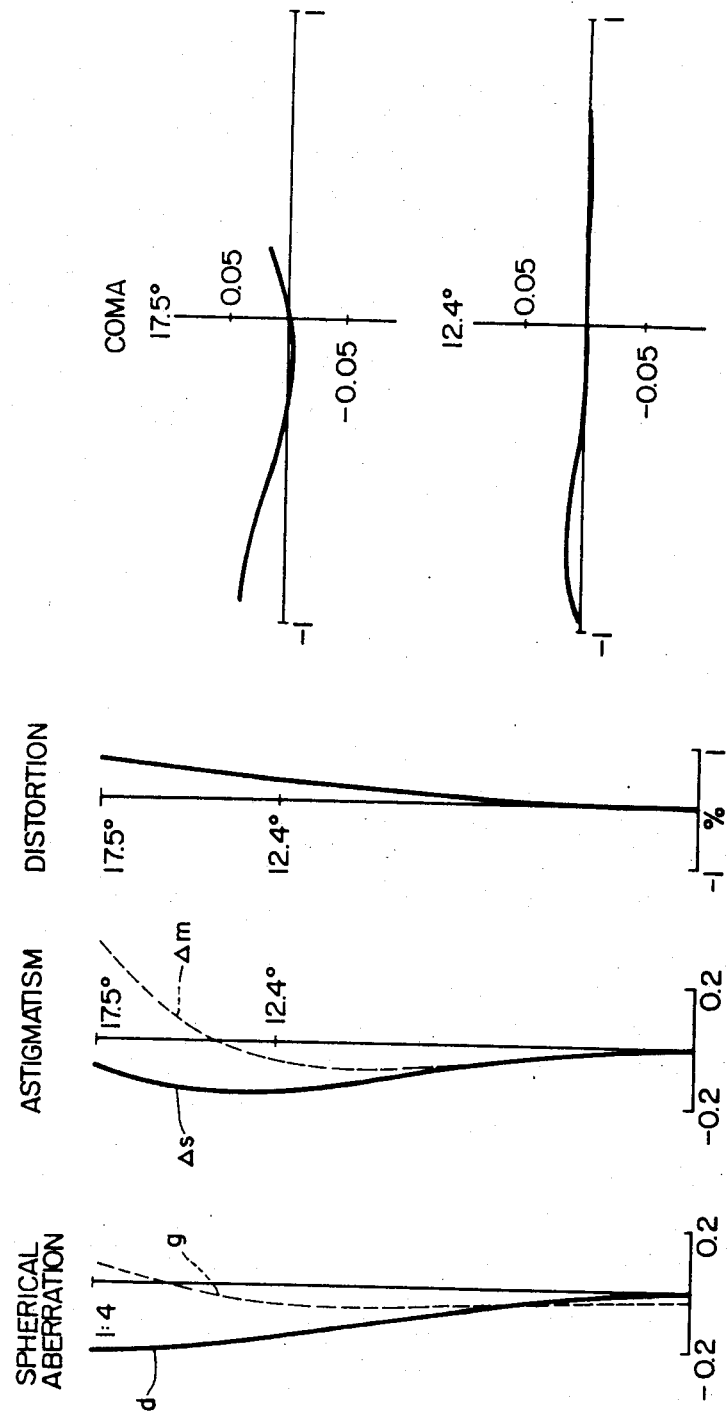

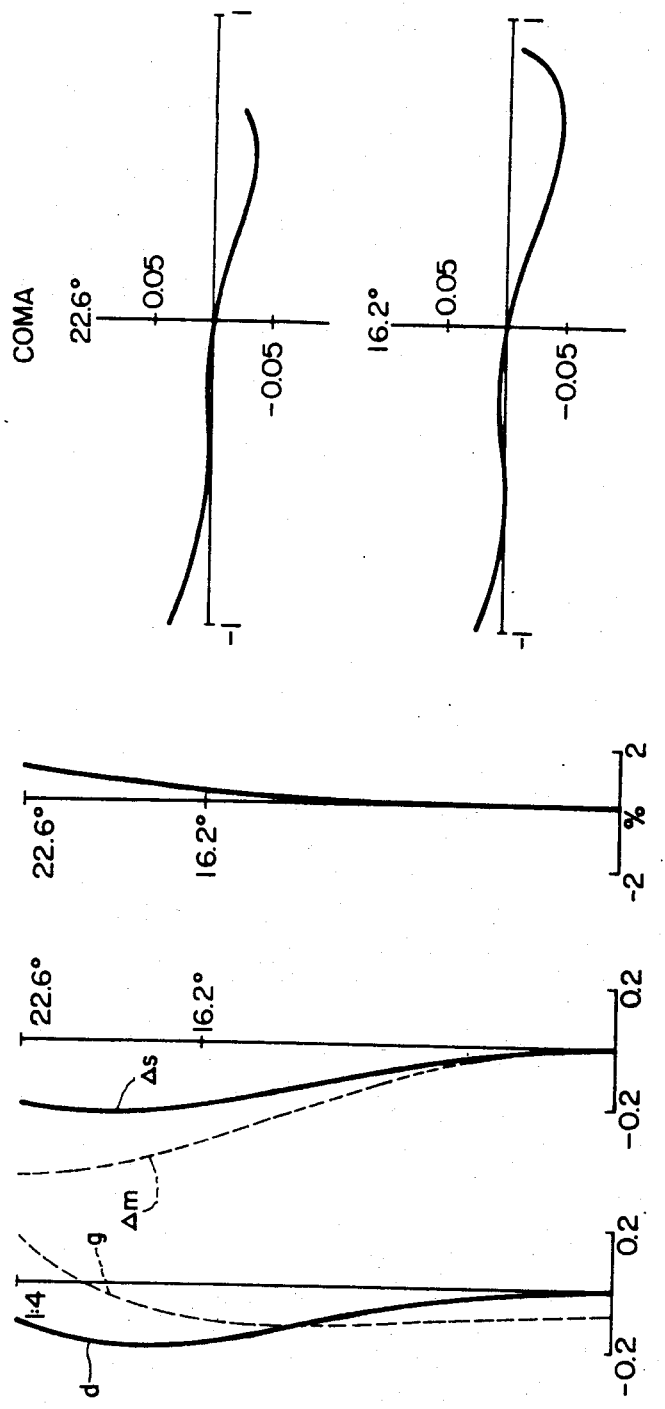

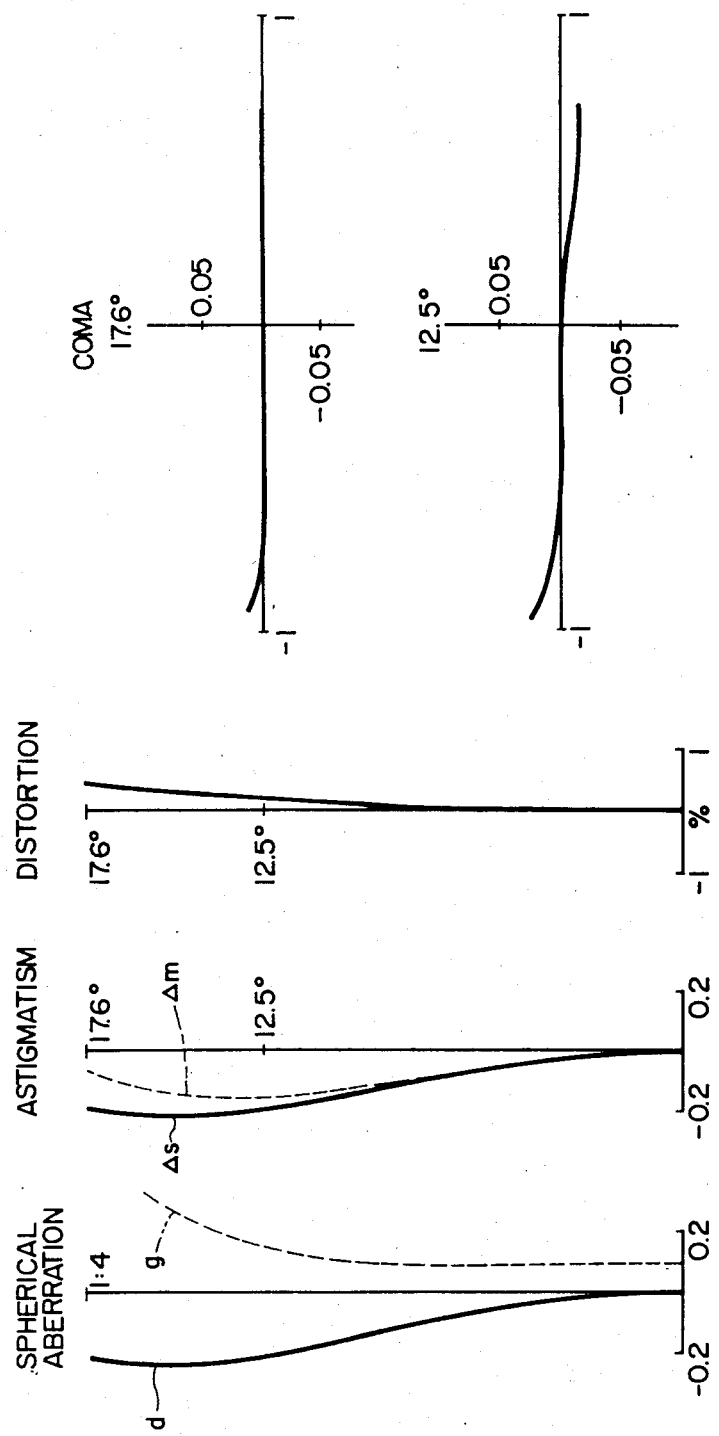

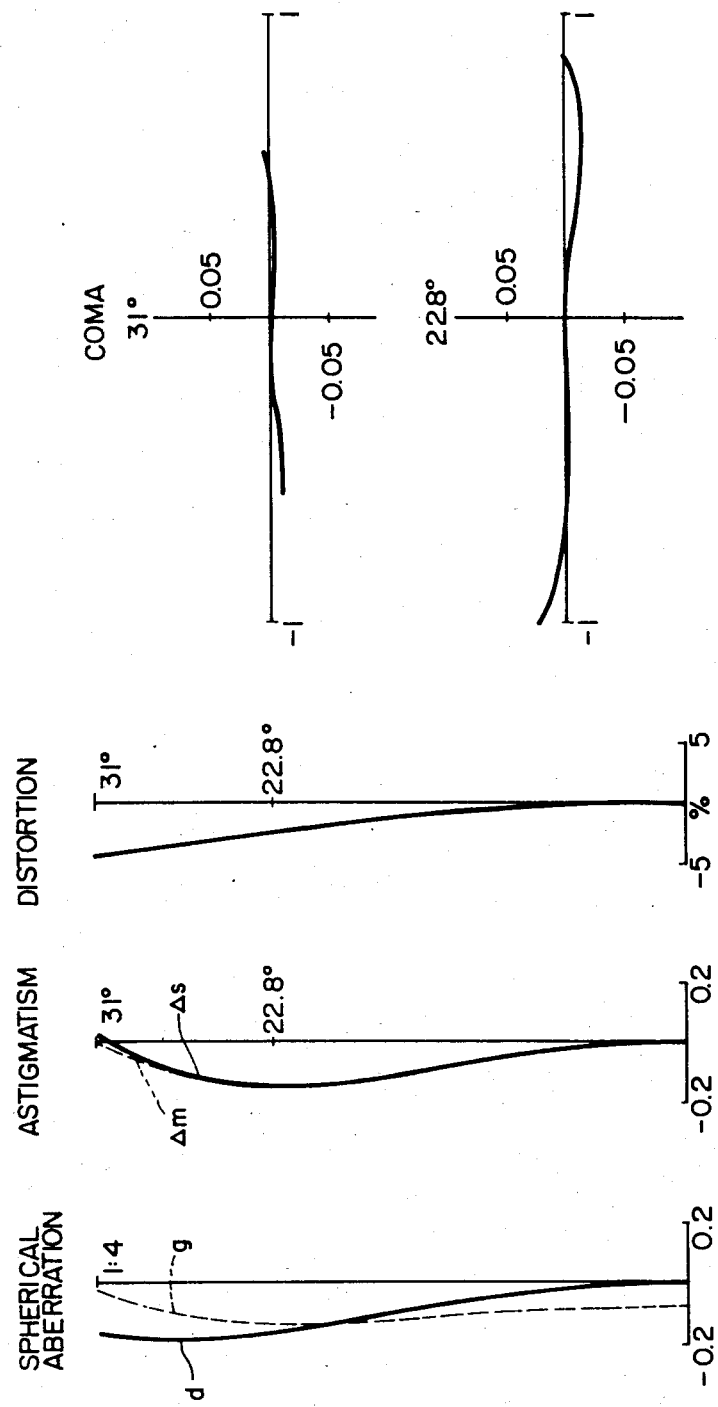

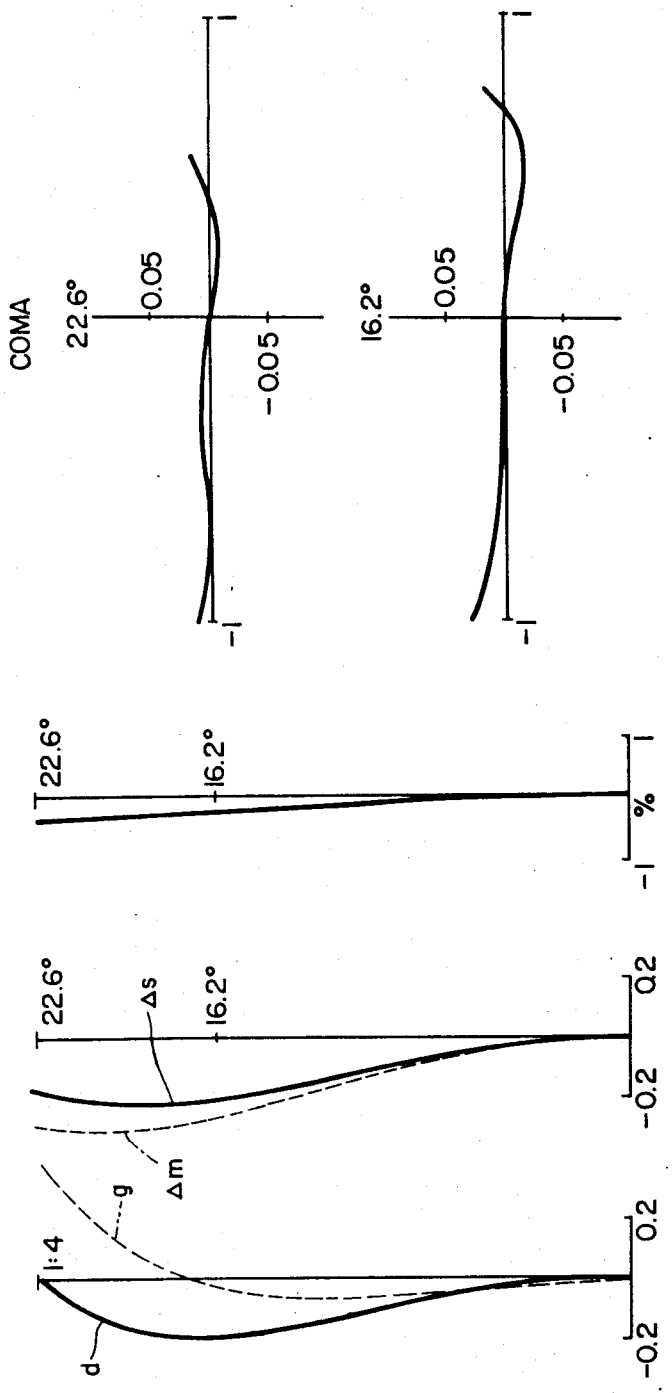

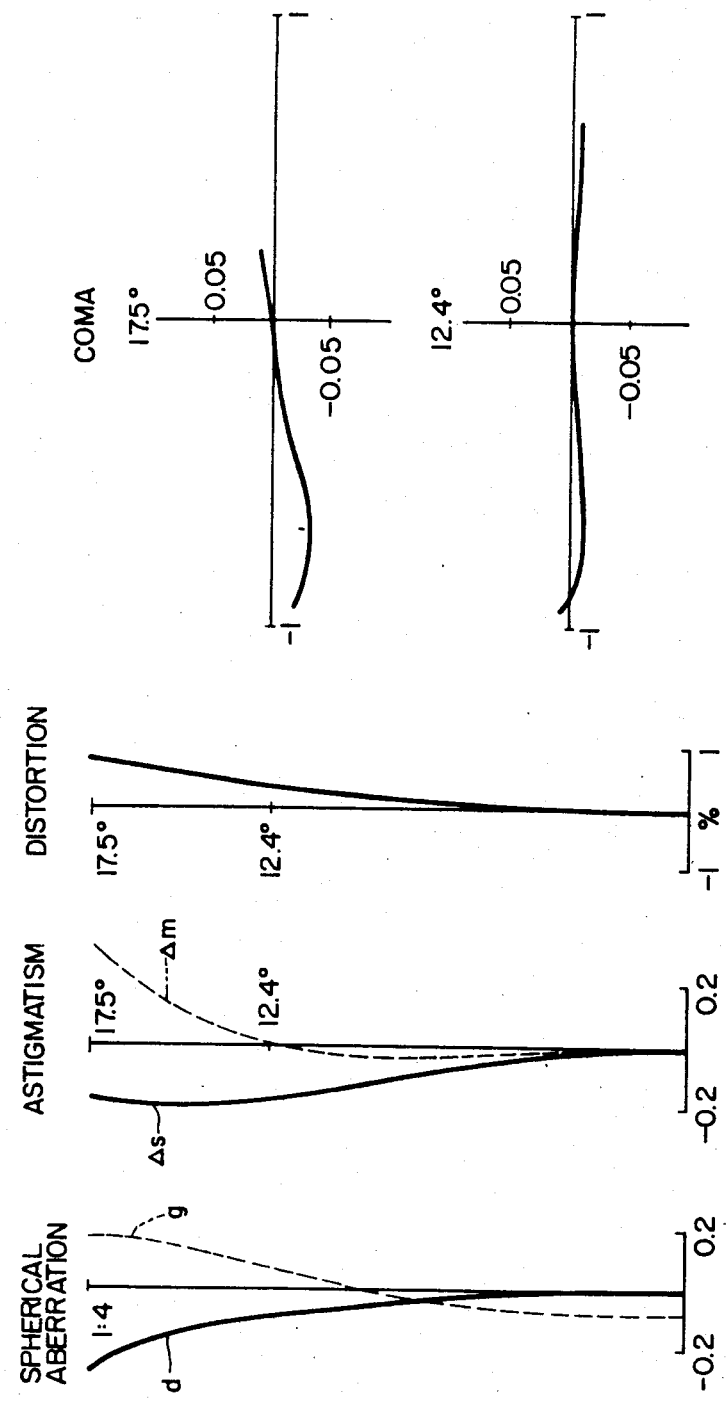

WIDE ANGLE ZOOM LENS SYSTEM

This is a continuation of application Ser. No. 187,448, filed Sept. 15, 1980 now abandoned.

BACKGROUND OF THE INVENTION (a) Field of the Invention

The present invention relates to a wide-angle zoom lens system comprising two groups of seven lens components consisting of seven lens elements and permitting changing field angle within a range from 62° to 35°.

(b) Description of the Prior Art

There have conventionally been known zoom lens systems comprising two groups of seven lens components consisting of seven lens elements.

However, the conventional zoom lens systems had defects in that they were designed for narrow field angles and low zooming ratios, required high manufacturing cost since they used glass materials having high refractive indices when they are designed for relatively wide field angles and high zooming ratio, or posed problems related to manufacturing due to glass materials low in their machinability.

SUMMARY OF THE INVENTION

A general object of the present invention is to provide a wide-angle zoom lens system designed for a wide field angle of 62°, a high zooming ratio, comprising seven components of seven lens elements, and having favorably corrected aberrations even under strict conditions to use glass materials which have relatively low refractive indices and machinability high enough to make these materials available at low prices.

The zoom lens system according to the present invention has such a composition as shown in FIG. 1, comprises a front lens group having diverging power as a whole and a rear lens group having converging power as a whole, and is so adapted as to change magnification level by varying an airspace reserved between said two lens groups. Said front lens group comprises a first negative meniscus lens component having a surface with a small radius of curvature on the image side, a second negative lens component and a third positive lens component, whereas said rear lens group comprises a fourth positive lens component, a fifth positive meniscus lens component having a surface with a small radius of curvature on the object side, a sixth negative lens component having a surface with a small radius of curvature on the image side and a seventh positive lens component. In order to accomplish the afore-mentioned object, the lens system according to the present invention zooming ratio of about 1.9 is characterized in that it is so designed as to satisfy the following conditions:

$$1 < |f_1/f_M| < 1.5 \tag{1}$$

$$0.8 < |f_2/f_M| < 1.2 \tag{2}$$

$$1 < |f_3/f_M| < 1.5 \tag{3}$$

$$n_1, n_2 < 1.65 \tag{4}$$

$$n_4, n_5 < 1.7 \tag{5}$$

wherein the reference symbols are defined as follows:
$f_M$: focal length of the front lens group
$f_1$, $f_2$ and $f_3$: focal lengths of the first, second and third lens components respectively $n_1$, $n_2$, $n_4$ and $n_5$: refractive indices of the first, second, fourth and fifth lens components respectively.

Further, the lens system according to the present invention can be made more favorable when it is designed so as to satisfy the additional conditions listed below:

$$0.6 < r_9/f_w < 0.8 \tag{6}$$

$$0.5 < r_{12}/f_w < 0.8 \tag{7}$$

$$1.4 < r_7/r_9 < 2.4 \tag{8}$$

wherein the reference symbols are defined as follows:
$f_w$: focal length of the entire lens systems as a whole when it is set at the wide position
$r_7$, $r_9$ and $r_{12}$: radii of curvature on the object side surface of the fourth lens component, object side surface of the fifth lens component and image side surface of the sixth lens component Among the conditions (1) through (5) mentioned above, the conditions (1) through (3) have been adopted for correcting aberrations with good balance and designing the entire lens system compact. If the lower limits of the conditions (1) through (3) are exceeded, the entire lens system can be made compact effectively, but the individual lens components will have power strong enough to lose good balance among aberrations, resulting in undesirable effect. If the upper limits are exceeded, in contrast, desirable effect can be obtained for correcting aberrations favorably, but it will be impossible to design the entire lens system compact as a whole.

The conditions (4) and (5) relate to curvature of field in the lens system. If $n_1$ or $n_2$ exceeds the upper limit of the condition (4) under the conditions (1) through (4), the image plane will be curved remarkably at marginal portions toward the object side. If $n_4$ or $n_5$ exceeds the upper limit of the condition (5) under the conditions (1) through (4), the image plane will be curved too little, resulting in effect undesirable for properly balancing aberrations. As a result, if the upper limits of the conditions (4) and (5) are exceeded, good balance will be lost among distortion, astigmatism and flare due to coma.

As is described above, the conditions (1) through (5) are required for obtaining good balance among aberrations, especially for minimizing astigmatic difference, maintaining adequate curvature of the image plane, minimizing difference between the optimum image plane formed by paraxial rays and the optimum image plane formed by offaxial rays when the lens system is set in stop-down condition and obtaining an image with little flare due to coma and with high contrast in the lens system consisting of seven components of seven lens elements. As is already described above, the above-described effects can be made more remarkable by designing the lens system so as to satisfy the additional conditions (6) through (8).

If $r_9$ is smaller than the lower limit of the condition (6), variation of astigmatism will be increased in zooming operation. If the upper limit of the condition (6) is exceeded, in contrast, spherical aberration will be overcorrected.

If $r_{12}$ is smaller than the lower limit of the condition (7), spherical aberration will be overcorrected. If the upper limit of the condition (7) is exceeded, in contrast, spherical aberration will be undercorrected.

If the ratio of $r_7$ relative to $r_9$ is smaller than the lower limit of the condition (8), variation of astigmatism due to zooming operation will be increased. If the upper limit of the condition (7) is exceeded, in contrast, the front principal point of the rear lens group will shift toward the image plane, thereby producing mutual interference among the lens components at the tele position of the lens system. When the lens system is designed so as to satisfy the following conditions (9) through (16) in addition to the afore-mentioned conditions (1) through (8), it can be made a further more favorable zoom lens system.

$$0.75 < f_5/f_4 < 1.25 \quad (9)$$

$$0.5 < f_{4,5}/f_7 < 0.7 \quad (10)$$
$$0.9 < f_7/f_u < 1.2 \quad (11)$$

$$1.0 < r_1/f_w < 1.4 \quad (12)$$

$$0.8 < r_4/f_w < 1.5 \quad (13)$$

$$0.8 < r_5/f_w < 1.1 \quad (14)$$

$$0.1 < d_4/f_w < 0.14 \quad (15)$$

$$0.15 < (d_{10}+d_{12})/f_w < 0.35 \quad (16)$$

wherein the reference symbols are as defined below:

$f_4$, $f_5$ and $f_7$: refractive powers of the fourth, fifth and seventh lens components respectively $f_{4,5}$: total focal length of the fourth and fifth lens components $f_u$: focal length of the rear lens group $r_1$, $r_4$ and $r_5$: radii of curvature on the object side surface of the first lens component, image side surface of the second lens component and object side surface of the third lens component respectively $d_4$: airspace reserved between the second and third lens components $d_{10}$: airspace reserved between the fifth and sixth lens components $d_{12}$: airspace reserved between the sixth and seventh lens components Among the conditions (9) through (16), significance of the condition (9) will be described first. If the upper or lower limit of this condition is exceeded, the fourth or fifth lens component will have power too strong for correcting aberrations favorably. The conditions (10) and (11) define distribution of refractive powers among the lens components (the fourth and fifth lens components are considered as a single component) of the rear lens group when it is regarded as a triplet. If the ranges defined by these conditions are deviated, it will be difficult to correct aberrations with good balance. If $r_1/f_w$ is smaller than the lower limit of 1.0 of the condition (12), spherical aberration will be aggravated. If $r_1/f_w$ is larger than the upper limit of 1.4, coma will be aggravated.

If $r_4/f_w$ is smaller than the lower limit of 0.8 of the condition (13), spherical aberration will be overcorrected. If the upper limit of 1.5 is exceeded, in contrast, balance will be degraded between the paraxial aberration and offaxial aberration.

If $r_5/f_w$ is smaller than the lower limit of 0.8 of the condition (14), spherical aberration will be undercorrected. If the upper limit of 1.1 is exceeded, balance will be degraded between the paraxial aberration and offaxial aberration.

If $d_4/f_w$ is smaller than the lower limit of 0.1 of the condition (15), balance will be degraded between the paraxial aberration and offaxial aberration. If the upper limit is exceeded, in contrast, it will be impossible to design the entire lens system compact.

If $(d_{10}+d_{12})/f_w$ is smaller than the lower limit of 0.15 of the condition (16), it will be difficult to minimize flare due to coma. If the upper limit of 0.35 is exceeded, it will be impossible to design the entire lens system compact.

In order to design the entire lens system compact, it is preferable to design the individual lens components as thin as possible. Therefore, the individual lens components should be as thin as possible within such a range as to permit reserving marginal thickness required depending on their effective diameters.

BRIEF DESCRIPTION OF THE DRAWINGS

FIG. 2A, FIG. 2B and FIG. 2C show curves illustrating the aberration characteristics of a first embodiment of the present invention;

FIG. 3A, FIG. 3B and FIG. 3C show curves illustrating the aberration characteristics of a second embodiment of the present invention;

FIG. 4A, FIG. 4B and FIG. 4C show curves illustrating the aberration characteristics of a third embodiment of the present invention;

FIG. 5A, FIG. 5B and FIG. 5C show curves illustrating the aberration characteristics of a fourth embodiment of the present invention;

FIG. 6A, FIG. 6B and FIG. 6C show graphs illustrating the aberration characteristics of a fifth embodiment of the present invention; and FIG. 7A, FIG. 7B and FIG. 7C show graphs illustrating the aberration characteristics of a sixth embodiment of the present invention.

DETAILED DESCRIPTION OF THE PREFERRED EMBODIMENTS

Figure 1:
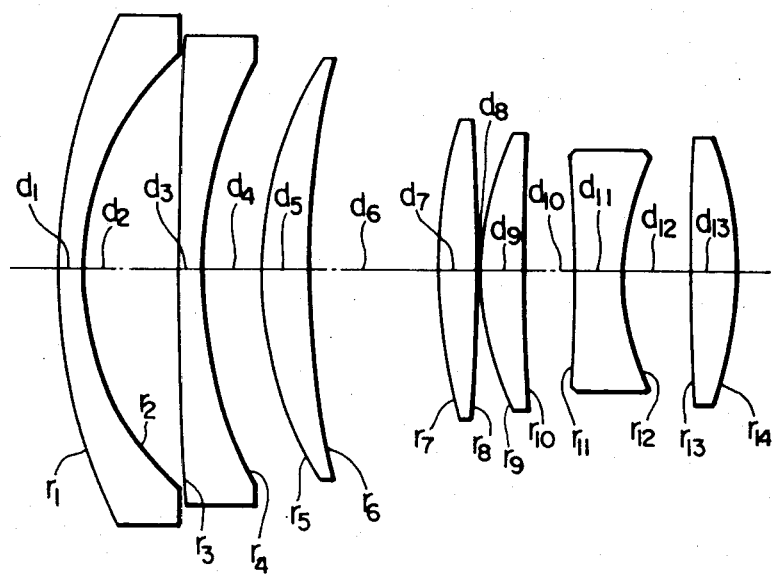
FIG. 1 shows a sectional view illustrating the composition of the zoom lens system according to the present invention.

Now, numerical data for the zoom lens system will be mentioned as preferred embodiments of the present invention:

| Embodiment 1 | | | |
|---|---|---|---|
| $r_1 = 42.3913$ | | | |
| | $d_1 = 2.090$ | $n_1 = 1.63854$ | $v_1 = 55.4$ |
| $r_2 = 23.5091$ | | | |
| | $d_2 = 8.100$ | | |
| $r_3 = 442.1958$ | | | |
| | $d_3 = 1.990$ | $n_2 = 1.63854$ | $v_2 = 55.4$ |
| $r_4 = 34.7672$ | | | |
| | $d_4 = 4.479$ | | |
| $r_5 = 32.2910$ | | | |
| | $d_5 = 4.280$ | $n_3 = 1.68893$ | $v_3 = 31.1$ |
| $r_6 = 73.6646$ | | | |
| | $d_6 = 36.741 \sim 0.550$ | | |
| $r_7 = 41.0666$ | | | |
| | $d_7 = 3.380$ | $n_4 = 1.65160$ | $v_4 = 58.7$ |
| $r_8 = -186.3587$ | | | |
| | $d_8 = 0.150$ | | |
| $r_9 = 24.5146$ | | | |
| | $d_9 = 3.590$ | $n_5 = 1.65830$ | $v_5 = 57.3$ |
| $r_{10} = 146.4997$ | | | |
| | $d_{10} = 4.207$ | | |
| $r_{11} = -86.5398$ | | | |
| | $d_{11} = 4.147$ | $n_6 = 1.80518$ | $v_6 = 25.4$ |
| $r_{12} = 20.7628$ | | | |
| | $d_{12} = 5.332$ | | |
| $r_{13} = 246.8300$ | | | |
| | $d_{13} = 3.443$ | $n_7 = 1.63980$ | $v_7 = 34.5$ |
| $r_{14} = -30.4106$ | | | |
| $f = 36.0 \sim 68.5$ | | | |

-continued

Embodiment 1

$f_M = -64.742$
$f_1 = -86.381$    $|f_1/f_M| = 1.334$
$f_2 = -59.207$    $|f_2/f_M| = 0.914$
$f_3 = 80.074$    $|f_3/f_M| = 1.237$
$r_9/f_w = 0.681$
$r_{12}/f_w = 0.578$
$r_7/r_9 = 1.675$
$f_u = 42.415$,   $f_4 = 51.948$,   $f_5 = 44.207$
$f_7 = 42.524$,   $f_{45} = 24.238$,   $f_5/f_4 = 0.851$
$f_{45}/f_7 = 0.570$,   $f_7/f_u = 1.003$,   $r_1/f_w = 1.178$
$r_4/f_w = 0.966$,   $r_5/f_w = 0.897$,   $d_4/f_w = 0.124$
$(d_{10} + d_{12})/f_w = 0.265$

Embodiment 2

$r_1 = 41.6846$
   $d_1 = 2.1$    $n_1 = 1.63854$   $\nu_1 = 55.4$
$r_2 = 22.5467$
   $d_2 = 8.424$
$r_3 = -428.99$
   $d_3 = 2$    $n_2 = 1.63854$   $\nu_2 = 55.4$
$r_4 = 49.2969$
   $d_4 = 4.039$
$r_5 = 35.6905$
   $d_5 = 4.3$    $n_3 = 1.72151$   $\nu_3 = 29.2$
$r_6 = 75.984$
   $d_6 = 36.36 \sim 0.809$
$r_7 = 36.7093$
   $d_7 = 3.858$    $n_4 = 1.6516$   $\nu_4 = 58.7$
$r_8 = -142.8056$
   $d_8 = 32\ 0.374$
$r_9 = 23.8535$
   $d_9 = 3.431$    $n_5 = 1.6516$   $\nu_5 = 58.7$
$r_{10} = 74.4075$
   $d_{10} = 3.666$
$r_{11} = -158.9446$
   $d_{11} = 6.245$    $n_6 = 1.80518$   $\nu_6 = 25.4$
$r_{12} = 19.0457$
   $d_{12} = 4.813$
$r_{13} = 79.6154$
   $d_{13} = 4.503$    $n_7 = 1.63636$   $\nu_7 = 35.4$
$r_{14} = -41.3063$
$f = 36.0 \sim 68.5$
$f_M = -65.0$
$f_1 = -80.344$    $|f_1/f_M| = 1.236$
$f_2 = -69.133$    $|f_2/f_M| = 1.064$
$f_3 = 89.288$    $|f_3/f_M| = 1.374$
$r_9/f_w = 0.663$
$r_{12}/f_w = 0.529$
$r_7/r_9 = 1.539$
$f_u = 41.498$,   $f_4 = 45.200$,   $f_5 = 52.476$
$f_7 = 43.365$,   $f_{45} = 24.609$,   $f_5/f_4 = 1.161$
$f_{45}/f_7 = 0.568$,   $f_7/f_u = 1.045$,   $r_1/f_w = 1.158$
$r_4/f_w = 1.369$,   $r_5/f_w = 0.991$,   $d_4/f_w = 0.112$
$(d_{10} + d_{12})/f_w = 0.236$

Embodiment 3

$r_1 = 40.7425$
   $d_1 = 2.04$    $n_1 = 1.63854$   $\nu_1 = 55.4$
$r_2 = 21.204$
   $d_2 = 8.035$
$r_3 = -420.9044$
   $d_3 = 1.94$    $n_2 = 1.63854$   $\nu_2 = 55.4$
$r_4 = 46.1762$
   $d_4 = 3.921$
$r_5 = 34.6606$
   $d_5 = 4.17$    $n_3 = 1.72342$   $\nu_3 = 38.0$
$r_6 = 84.0243$
   $d_6 = 36.249 \sim 1.792$
$r_7 = 47.5549$
   $d_7 = 6.345$    $n_4 = 1.6583$   $\nu_4 = 53.4$
$r_8 = -86.9323$
   $d_8 = 1.38$
$r_9 = 24.9887$
   $d_9 = 3.521$    $n_5 = 1.6583$   $\nu_5 = 53.4$ -continued

Embodiment 3

$r_{10} = 97.9338$
   $d_{10} = 3.835$
$r_{11} = -77.1075$
   $d_{11} = 6.447$    $n_6 = 1.80518$   $\nu_6 = 25.4$
$r_{12} = 23.2424$
   $d_{12} = 3.108$
$r_{13} = -693.5659$
   $d_{13} = 2.845$    $n_7 = 1.64769$   $\nu_7 = 33.8$
$r_{14} = -28.6171$
$f = 36.0 \sim 68.5$
$f_M = -63.0$
$f_1 = -72.182$    $|f_1/f_M| = 1.146$
$f_2 = -65.061$    $|f_2/f_M| = 1.033$
$f_3 = 78.761$    $|f_3/f_M| = 1.250$
$r_9/f_w = 0.694$
$r_{12}/f_w = 0.646$
$r_7/r_9 = 1.903$
$f_u = 41.500$,   $f_4 = 47.586$,   $f_5 = 50.005$
$f_7 = 46.007$,   $f_{45} = 25.206$,   $f_5/f_4 = 1.051$
$f_{45}/f_7 = 0.548$,   $f_7/f_u = 1.109$,   $r_1/f_w = 1.132$
$r_4/f_w = 1.283$,   $r_5/f_w = 0.963$,   $d_4/f_w = 0.109$
$(d_{10} + d_{12})/f_w = 0.193$

Embodiment 4

$r_1 = 43.7155$
   $d_1 = 2.24$    $n_1 = 1.6228$   $\nu_1 = 57.1$
$r_2 = 23.0467$
   $d_2 = 8.014$
$r_3 = 583.0754$
   $d_3 = 2.14$    $n_2 = 1.6228$   $\nu_2 = 57.1$
$r_4 = 37.4587$
   $d_4 = 4.698$
$r_5 = 32.383$
   $d_5 = 4.23$    $n_3 = 1.6398$   $\nu_3 = 34.5$
$r_6 = 74.6168$
   $d_6 = 36.743 \sim 0.599$
$r_7 = 52.9675$
   $d_7 = 3.498$    $n_4 = 1.691$   $\nu_4 = 54.8$
$r_8 = -127.281$
   $d_8 = 0.202$
$r_9 = 23.6257$
   $d_9 = 3.652$    $n_5 = 1.641$   $\nu_5 = 56.9$
$r_{10} = 105.906$
   $d_{10} = 5.191$
$r_{11} = -81.9425$
   $d_{11} = 2.989$    $n_6 = 1.80518$   $\nu_6 = 25.4$
$r_{12} = 21.7018$
   $d_{12} = 5.257$
$r_{13} = 196.271$
   $d_{13} = 4.241$    $n_7 = 1.60342$   $\nu_7 = 38.0$
$r_{14} = -28.1096$
$f = 36.0 \sim 68.0$
$f = -64.038$
$f_1 = -81.664$    $|f_1/f_M| = 1.275$
$f_2 = -64.372$    $|f_2/f_M| = 1.005$
$f_3 = 86.06$    $|f_3/f_M| = 1.344$
$r_9/f_w = 0.656$
$r_{12}/f_w = 0.603$
$r_7/r_9 = 2.242$
$f_u = 43.177$,   $f_4 = 54.561$,   $f_5 = 46.632$
$f_7 = 41.040$,   $f_{45} = 25.406$,   $f_5/f_4 = 0.855$
$f_{45}/f_7 = 0.619$,   $f_7/f_u = 0.951$,   $r_1/f_w = 1.214$
$r_4/f_w = 1.041$,   $r_5/f_w = 0.900$,   $d_4/f_w = 0.131$
$(d_{10} + d_{12})/f_w = 0.290$

Embodiment 5

$r_1 = 45.2632$
   $d_1 = 2.24$    $n_1 = 1.6228$   $\nu_1 = 57.1$
$r_2 = 23.6043$
   $d_2 = 8.01$
$r_3 = 373.8232$
   $d_3 = 2.14$    $n_2 = 1.6228$   $\nu_2 = 57.1$
$r_4 = 35.669$
   $d_4 = 4.763$

-continued

Embodiment 5

| | | | |
|---|---|---|---|
| $r_5 = 32.1537$ | | | |
| | $d_5 = 4.23$ | $n_3 = 1.64769$ | $\nu_3 = 33.8$ |
| $r_6 = 72.9747$ | | | |
| | $d_6 = 36.911 \sim 0.767$ | | |
| $r_7 = 42.6462$ | | | |
| | $d_7 = 3.441$ | $n_4 = 1.6583$ | $\nu_4 = 53.4$ |
| $r_8 = -155.773$ | | | |
| | $d_8 = 0.152$ | | |
| $r_9 = 25.6664$ | | | |
| | $d_9 = 3.65$ | $n_5 = 1.6583$ | $\nu_5 = 53.4$ |
| $r_{10} = 161.4985$ | | | |
| | $d_{10} = 4.267$ | | |
| $r_{11} = -75.8712$ | | | |
| | $d_{11} = 4.204$ | $n_6 = 1.80518$ | $\nu_6 = 25.4$ |
| $r_{12} = 21.7747$ | | | |
| | $d_{12} = 5.598$ | | |
| $r_{13} = 340.309$ | | | |
| | $d_{13} = 3.877$ | $n_7 = 1.62606$ | $\nu_7 = 39.1$ |
| $r_{14} = -28.7092$ | | | |

$f = 36.0 \sim 68.0$
$f_M = -64.038$
$f_1 = -82.479 \quad |f_1/f_M| = 1.288$
$f_2 = -63.467 \quad |f_2/f_M| = 0.991$
$f_3 = -85.273 \quad |f_3/f_M| = 1.332$
$r_9/f_w = 0.713$
$r_{12}/f_w = 0.605$
$r_7/r_9 = 1.662$
$f_u = 43.178, \quad f_4 = 51.211, \quad f_5 = 45.867$
$f_7 = 42.461, \quad f_{45} = 24.545, \quad f_5/f_4 = 0.896$
$f_{45}/f_7 = 0.578, \quad f_7/f_u = 0.983, \quad r_1/f_w = 1.257$
$r_4/f_w = 0.991, \quad r_5/f_w = 0.893, \quad d_4/f_w = 0.132$
$(d_{10} + d_{12})/f_w = 0.274$

Embodiment 6

| | | | |
|---|---|---|---|
| $r_1 = 47.226$ | | | |
| | $d_1 = 2.1$ | $n_1 = 1.6228$ | $\nu_1 = 57.1$ |
| $r_2 = 22.7022$ | | | |
| | $d_2 = 7.878$ | | |
| $r_3 = -456.3736$ | | | |
| | $d_3 = 2$ | $n_2 = 1.6228$ | $\nu_2 = 57.1$ |
| $r_4 = 40.3657$ | | | |
| | $d_4 = 3.944$ | | |
| $r_5 = 35.5408$ | | | |
| | $d_5 = 4.17$ | $n_3 = 1.72342$ | $\nu_3 = 38.0$ |
| $r_6 = 104.6907$ | | | |
| | $d_6 = 35.706 \sim 0.052$ | | |
| $r_7 = 52.7644$ | | | |
| | $d_7 = 6.343$ | $n_4 = 1.6583$ | $\nu_4 = 57.3$ |
| $r_8 = -102.0611$ | | | |
| | $d_8 = 2.009$ | | |
| $r_9 = 26.2833$ | | | |
| | $d_9 = 3.63$ | $n_5 = 1.6583$ | $\nu_5 = 57.3$ |
| $r_{10} = 107.5007$ | | | |
| | $d_{10} = 3.93$ | | |
| $r_{11} = -73.0658$ | | | |
| | $d_{11} = 6.64$ | $n_6 = 1.80518$ | $\nu_6 = 25.4$ |
| $r_{12} = 25.2538$ | | | |
| | $d_{12} = 3.394$ | | |
| $r_{13} = 318.6274$ | | | |
| | $d_{13} = 3.282$ | $n_7 = 1.64769$ | $\nu_7 = 33.8$ |
| $r_{14} = -28.9424$ | | | |

$f = 36.0 \sim 68.5$
$f_M = -63.0$
$f_1 = -72.581 \quad |f_1/f_M| = 1.152$
$f_2 = -59.455 \quad |f_2/f_M| = 0.944$
$f_3 = 72.543 \quad |f_3/f_M| = 1.151$
$r_9/f_w = 0.73$
$r_{12}/f_w = 0.701$
$r_7/r_9 = 2.008$
$f_u = 42.941, \quad f_4 = 53.710, \quad f_5 = 51.925$
$f_7 = 41.117, \quad f_{45} = 27.407, \quad f_5/f_4 = 0.967$
$f_{45}/f_7 = 0.667, \quad f_7/f_u = 0.958, \quad r_1/f_w = 1.312$
$r_4/f_w = 1.121, \quad r_5/f_w = 0.987, \quad d_4/f_w = 0.110$
$(d_{10} + d_{12})/f_w = 0.204$ wherein the reference symbols $r_1$ through $r_{14}$ represent radii of curvature on the surfaces of the respective lens elements, the reference symbols $d_1$ through $d_{13}$ designate thicknesses of the respective lens elements and airspaces reserved therebetween, the reference symbols $n_1$ through $n_7$ denote refractive indices of the respective lens elements, the reference symbols $\nu_1$ through $\nu_7$ represent Abbe's numbers of the respective lens elements and the reference symbol f designates focal length of the entire zoom lens system as a whole.

Figure 2A:
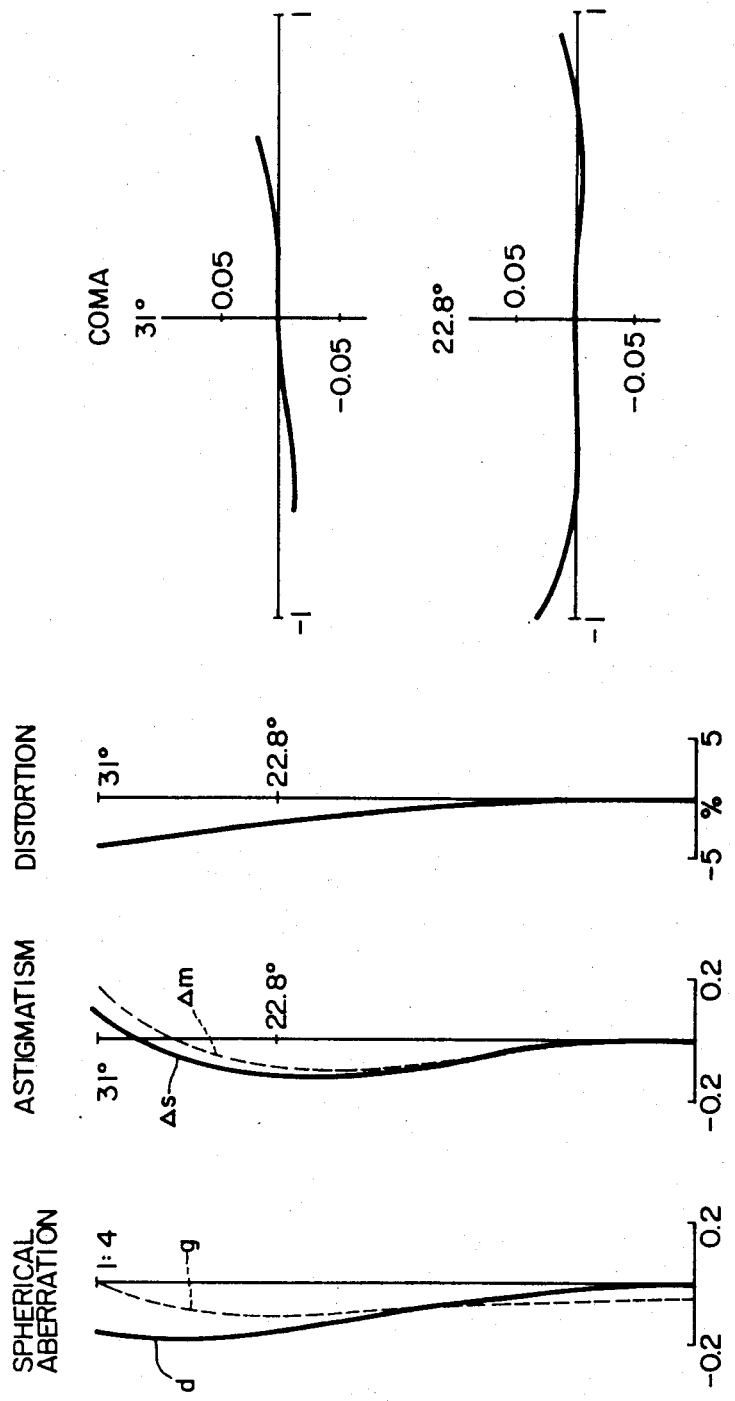
Figure 3A:
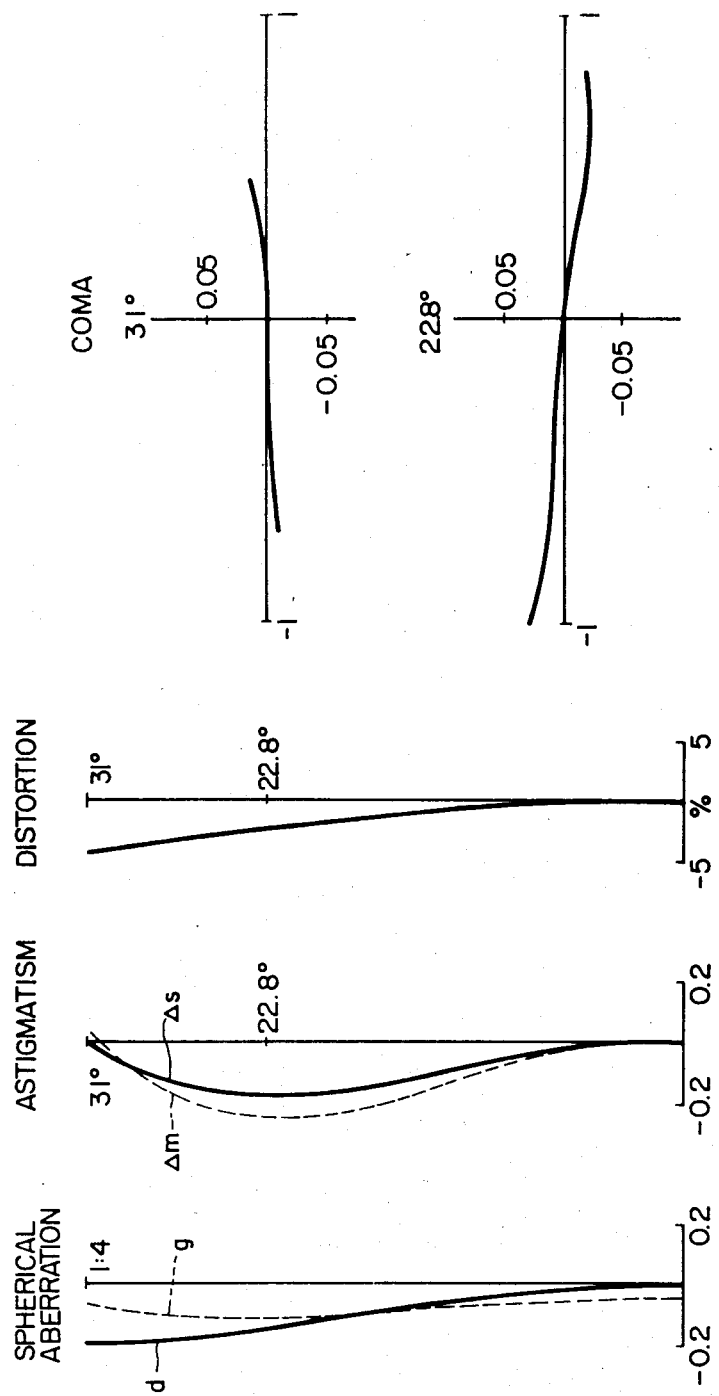
Figure 4A:
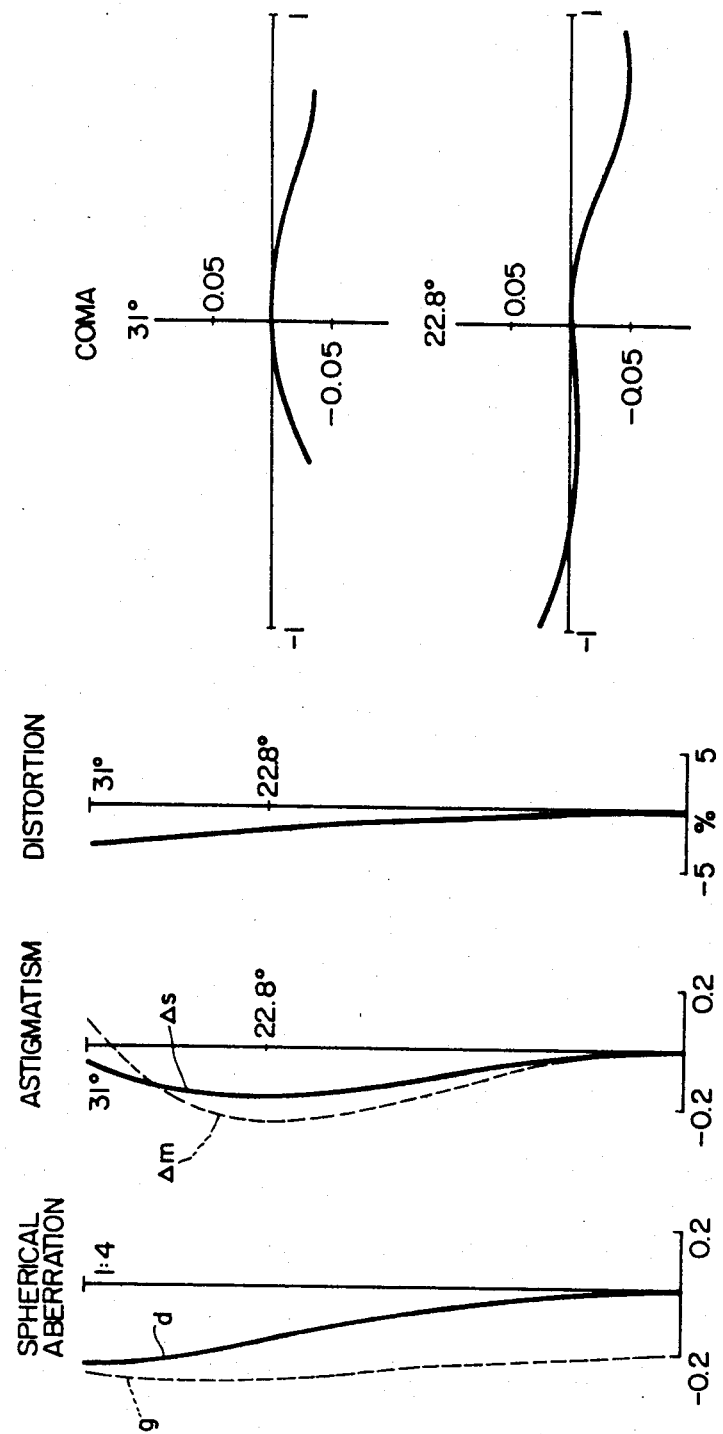
Figure 4C:
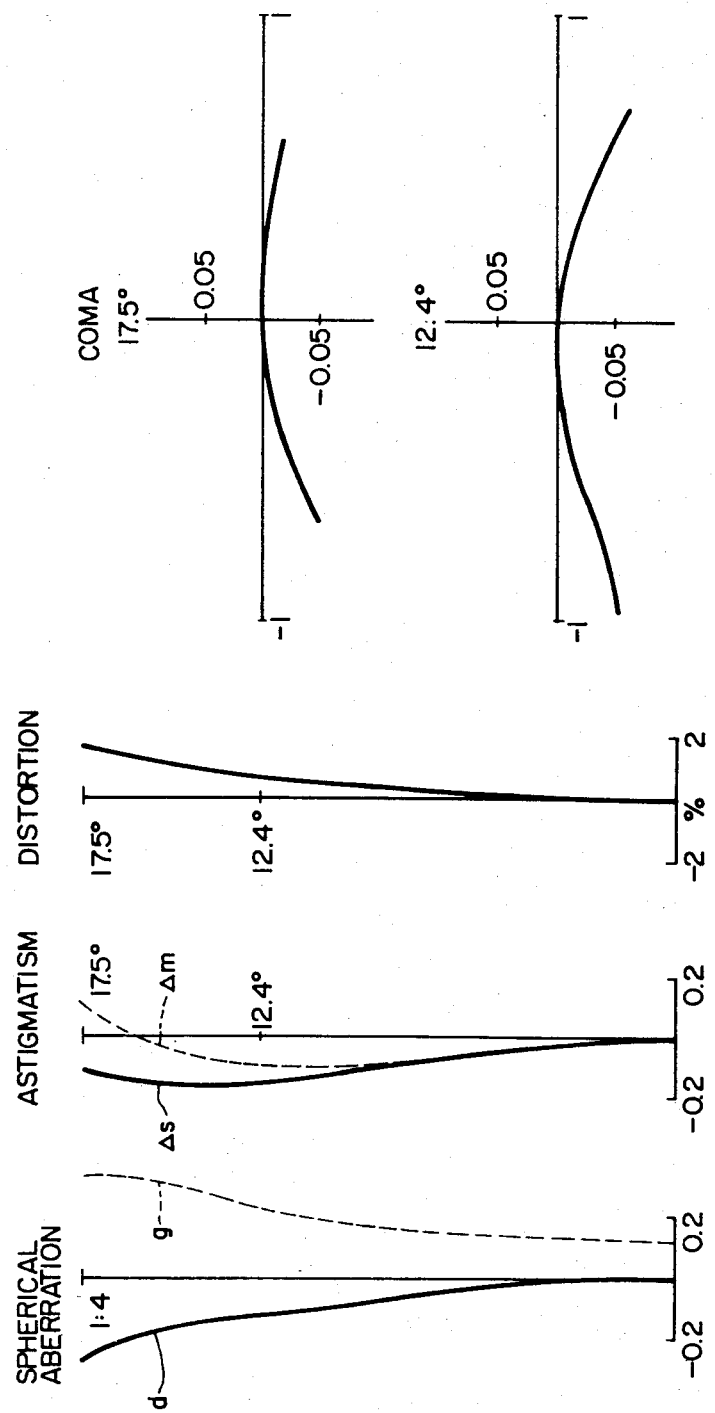
Figure 5A:
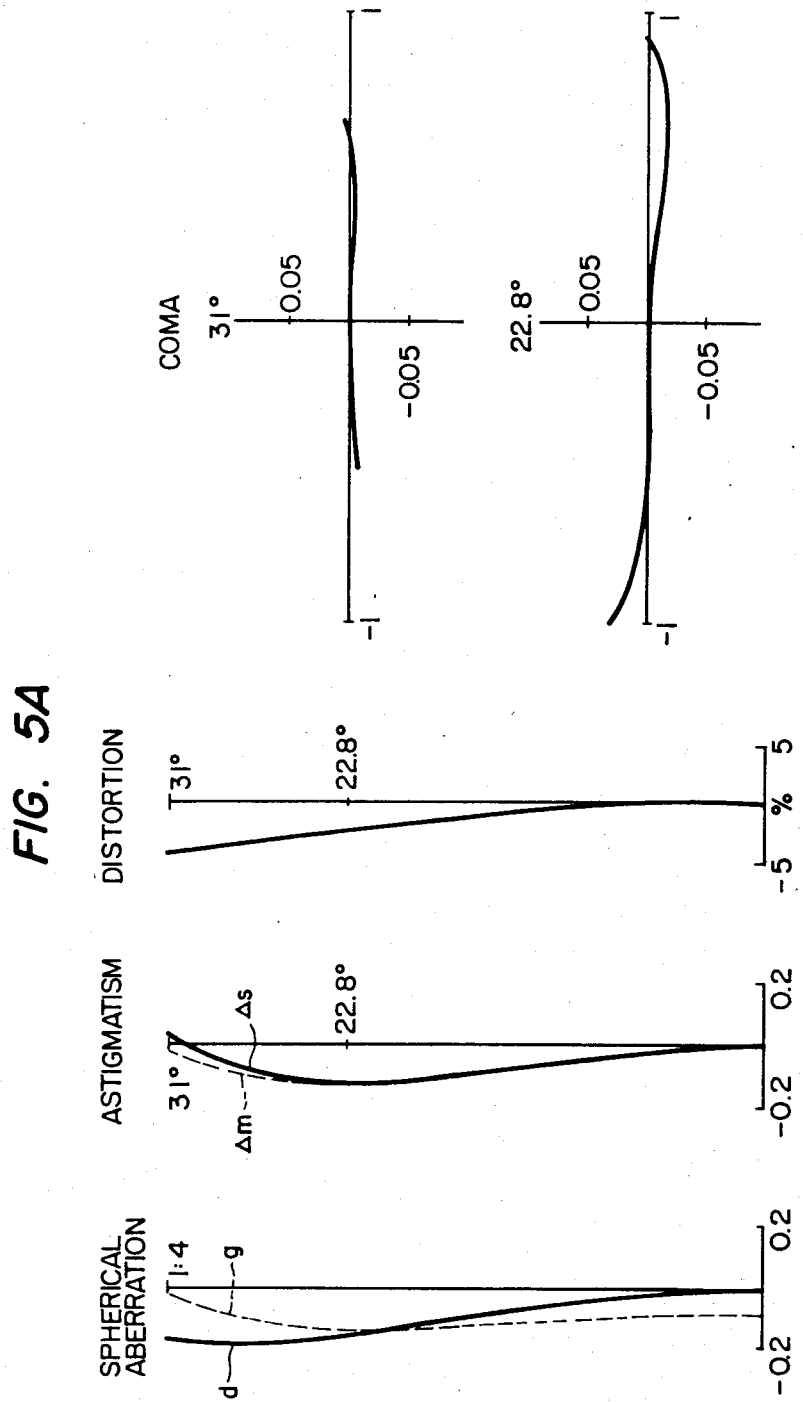
Figure 5B:
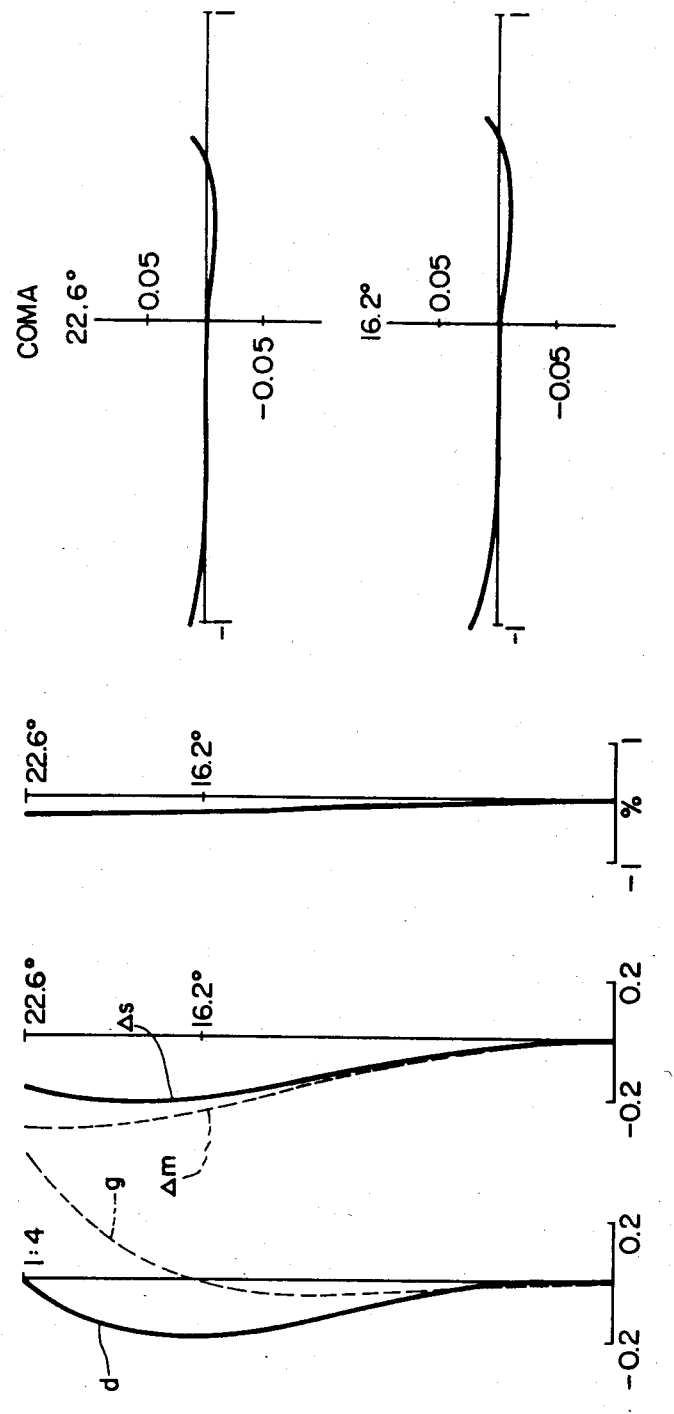
Figure 6C:
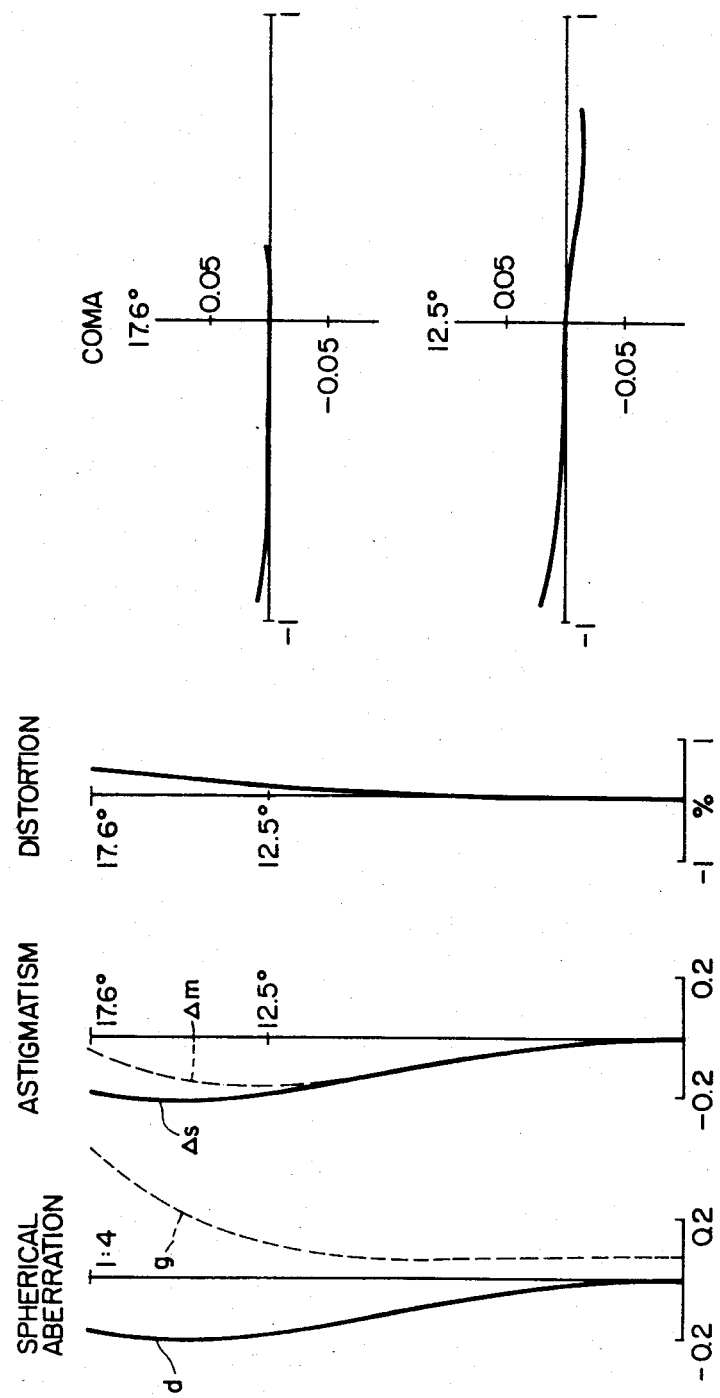
Figure 7A:
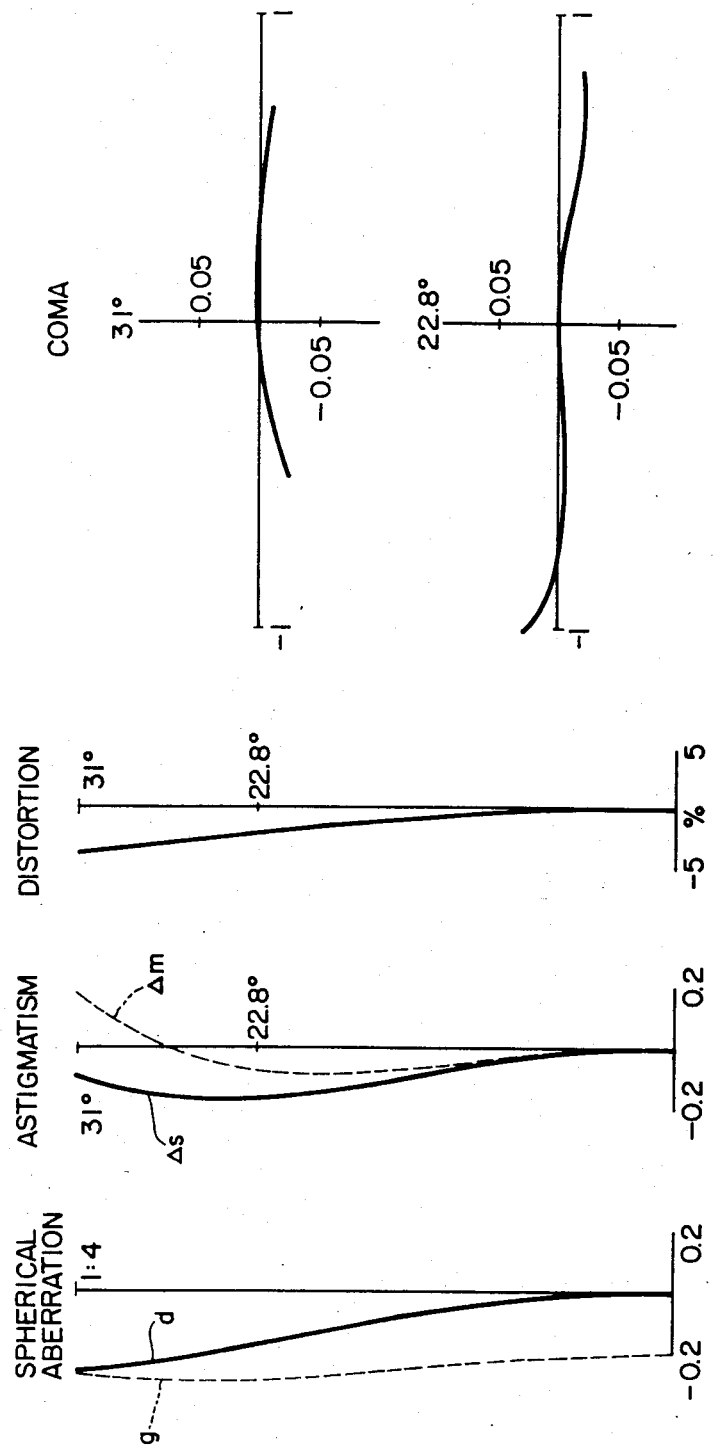
Figure 7B:
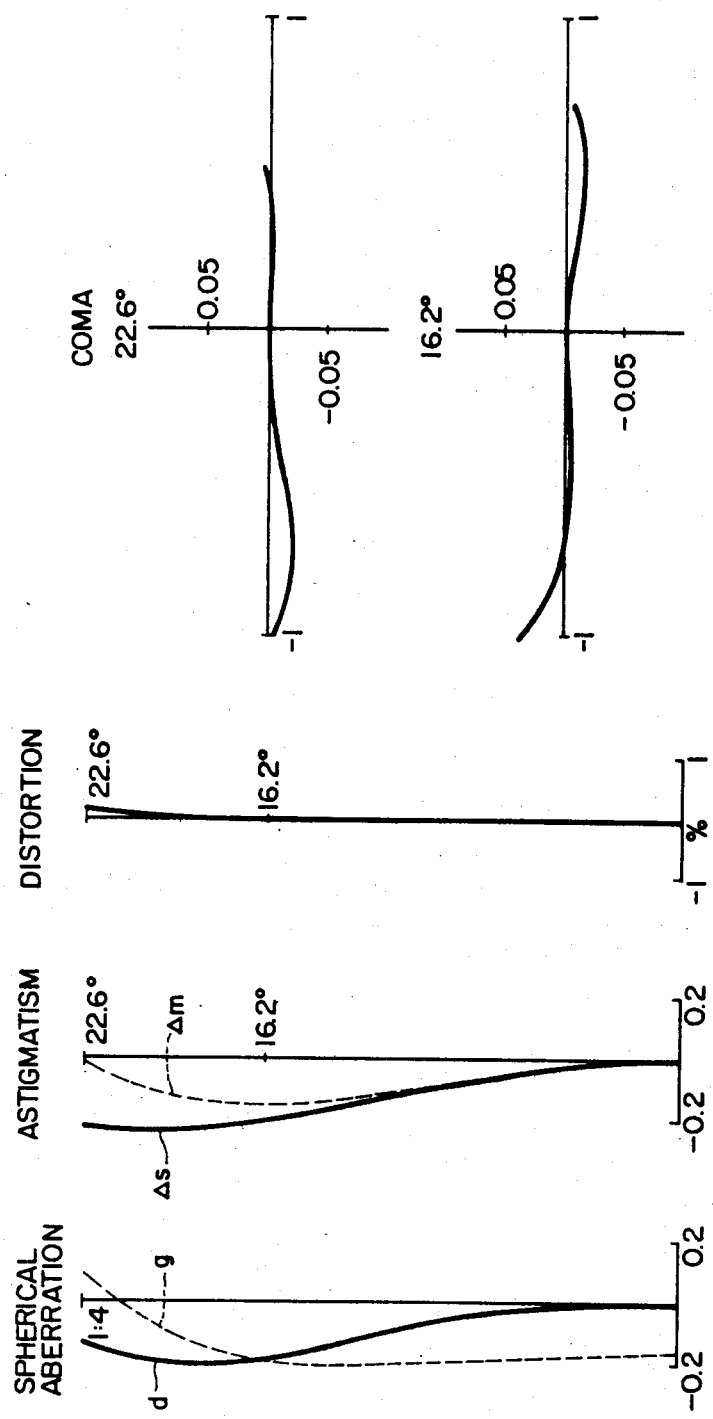

The aberration characteristics of the above-mentioned embodiments 1 through 6 are illustrated in FIG. 2A through FIG. 2C, FIG. 3A through FIG. 3C, FIG. 4A through FIG. 4C, FIG. 5A through FIG. 5C, FIG. 6A through FIG. 6C and FIG. 7A through FIG. 7C respectively.

Out of these aberration characteristic curves, those shown in FIG. 2A, FIG. 3A, FIG. 4A, FIG. 5A, FIG. 6A and FIG. 7A illustrate aberrations at the wide position of the zoom lens system, whereas the curves shown in FIG. 2B, FIG. 3B, FIG. 4B, FIG. 5B, FIG. 6B and FIG. 7B illustrate aberrations at intermediate position of the zoom lens system. The curves shown in FIG. 2C, FIG. 3C, FIG. 4C, FIG. 5C, FIG. 6C and FIG. 7C illustrate aberration at the tele position of the zoom lens system according to the present invention.

I claim:

1. A wide-angle zoom lens system comprising a front lens group consisting of a first negative lens component having a surface with a small radius of curvature on the image side, a second negative lens component and a third positive lens component, and a rear lens group consisting of a fourth positive lens component, a fifth positive lens component having a surface with a small radius of curvature on the object side, a sixth negative lens component having a surface with a small radius of curvature on the image side and a seventh positive lens component, said zoom lens system being so adapted as to perform the zooming operation by varying the airspace reserved between said front lens group and rear lens group, and having the following numerical data:

| | | | |
|---|---|---|---|
| $r_1 = 42.3913$ | | | |
| | $d_1 = 2.090$ | $n_1 = 1.63854$ | $\nu_1 = 55.4$ |
| $r_2 = 23.5091$ | | | |
| | $d_2 = 8.100$ | | |
| $r_3 = 442.1958$ | | | |
| | $d_3 = 1.990$ | $n_2 = 1.63854$ | $\nu_2 = 55.4$ |
| $r_4 = 34.7672$ | | | |
| | $d_4 = 4.479$ | | |
| $r_5 = 32.2910$ | | | |
| | $d_5 = 4.280$ | $n_3 = 1.68893$ | $\nu_3 = 31.1$ |
| $r_6 = 73.6646$ | | | |
| | $d_6 = 36.741 \sim 0.550$ | | |
| $r_7 = 41.0666$ | | | |
| | $d_7 = 3.380$ | $n_4 = 1.65160$ | $\nu_4 = 58.7$ |
| $r_8 = -186.3587$ | | | |
| | $d_8 = 0.150$ | | |
| $r_9 = 24.5146$ | | | |
| | $d_9 = 3.590$ | $n_5 = 1.65830$ | $\nu_5 = 57.3$ |
| $r_{10} = 146.4997$ | | | |
| | $d_{10} = 4.207$ | | |
| $r_{11} = -86.5398$ | | | |
| | $d_{11} = 4.147$ | $n_6 = 1.80518$ | $\nu_6 = 25.4$ |
| $r_{12} = 20.7628$ | | | |
| | $d_{12} = 5.332$ | | |
| $r_{13} = 246.8300$ | | | |
| | $d_{13} = 3.443$ | $n_7 = 1.63980$ | $\nu_7 = 34.5$ |
| $r_{14} = -30.4106$ | | | |

$f = 36.0 \sim 68.5$
$f_M = -64.742$
$f_1 = -86.381 \quad |f_1/f_M| = 1.334$
$f_2 = -59.207 \quad |f_2/f_M| = 0.914$
$f_3 = 80.074 \quad |f_3/f_M| = 1.237$
$r_9/f_w = 0.681$ -continued $$r_{12}/f_w = 0.578$$
$$r_7/r_9 = 1.675$$
$f_u = 42.415,$ $f_4 = 51.948,$ $f_5 = 44.207$
$f_7 = 42.524,$ $f_{45} = 24.238,$ $f_5/f_4 = 0.851$
$f_{45}/f_7 = 0.570,$ $f_7/f_u = 1.003,$ $r_1/f_w = 1.178$
$r_4/f_w = 0.966,$ $r_5/f_w = 0.897,$ $d_4/f_w = 0.124$
$(d_{10} + d_{12})/f_w = 0.265$ wherein the reference symbols $r_1$ through $r_{14}$ represent radii of curvature on the surfaces of the respective lens elements, the reference symbols $d_1$ through $d_{13}$ designate thicknesses of the respective lens elements and airspaces reserved therebetween, the reference symbols $n_1$ through $n_7$ denote refractive indices of the respective lens elements, the reference symbols $\nu_1$ through $\nu_7$ represent Abbe's numbers of the respective lens elements, the reference symbol f designates focal length of the zoom lens system as a whole, the reference symbol $f_m$ represents focal length of said front lens group, and the reference symbols $f_1$, $f_2$ and $f_3$ designate focal lengths of said first, second and third lens components respectively.

2. A wide-angle zoom lens system comprising a front lens group consisting of a first negative lens component having a surface with a small radius of curvature on the image side, a second negative lens component and a third positive lens component, and a rear lens group consisting of a fourth positive lens component, a fifth positive lens component having a surface with a small radius of curvature on the object side, a sixth negative lens component having a surface with a small radius of curvature on the image side and a seventh positive lens component, said zoom lens system being so adapted as to perform the zooming operation by varying the airspace reserved between said front lens group and rear lens group, and having the following numerical data:

| | | | |
|---|---|---|---|
| $r_1 = 41.6846$ | | | |
| | $d_1 = 2.1$ | $n_1 = 1.63854$ | $\nu_1 = 55.4$ |
| $r_2 = 22.5467$ | | | |
| | $d_2 = 8.424$ | | |
| $r_3 = -428.99$ | | | |
| | $d_3 = 2$ | $n_2 = 1.63854$ | $\nu_2 = 55.4$ |
| $r_4 = 49.2969$ | | | |
| | $d_4 = 4.039$ | | |
| $r_5 = 35.6905$ | | | |
| | $d_5 = 4.5$ | $n_3 = 1.72151$ | $\nu_3 = 29.2$ |
| $r_6 = 75.984$ | | | |
| | $d_6 = 36.36 \sim 0.809$ | | |
| $r_7 = 36.7093$ | | | |
| | $d_7 = 3.858$ | $n_4 = 1.6516$ | $\nu_4 = 58.7$ |
| $r_8 = -142.8056$ | | | |
| | $d_8 = 0.374$ | | |
| $r_9 = 23.8535$ | | | |
| | $d_9 = 3.431$ | $n_5 = 1.6516$ | $\nu_5 = 58.7$ |
| $r_{10} = 74.4075$ | | | |
| | $d_{10} = 3.666$ | | |
| $r_{11} = -158.9446$ | | | |
| | $d_{11} = 6.245$ | $n_6 = 1.80518$ | $\nu_6 = 25.4$ |
| $r_{12} = 19.0457$ | | | |
| | $d_{12} = 4.813$ | | |
| $r_{13} = 79.6154$ | | | |
| | $d_{13} = 4.503$ | $n_7 = 1.63636$ | $\nu_7 = 35.4$ |
| $r_{14} = -41.3063$ | | | |

$f = 36.0 \sim 68.5$
$f_M = -65.0$
$f_1 = -80.344$ $\quad |f_1/f_M| = 1.236$
$f_2 = -69.133$ $\quad |f_2/f_M| = 1.064$
$f_3 = 89.288$ $\quad |f_3/f_M| = 1.374$
$r_9/f_w = 0.663$
$r_{12}/f_w = 0.529$
$r_7/r_9 = 1.539$
$f_u = 41.498,$ $\quad f_4 = 45.200,$ $\quad f_5 = 52.476$ -continued $f_7 = 43.365,$ $f_{45} = 24.609,$ $f_5/f_4 = 1.163$
$f_{45}/f_7 = 0.568,$ $f_7/f_u = 1.045,$ $r_1/f_w = 1.158$
$r_4/f_w = 1.369,$ $r_5/f_w = 0.991,$ $d_4/f_w = 0.112$
$(d_{10} + d_{12})/f_w = 0.236$ wherein the reference symbols $r_1$ through $r_{14}$ represent radii of curvature on the surfaces of the respective lens elements, the reference symbols $d_1$ through $d_{13}$ designate thicknesses of the respective lens elements and airspaces reserved therebetween, the reference symbols $n_1$ through $n_7$ denote refractive indices of the respective lens elements, the reference symbols $\nu_1$ through $\nu_7$ represent Abbe's numbers of the respective lens elements, the reference symbol f designates focal length of the zoom lens system as a whole, the reference symbol $f_M$ represents focal length of said front lens group, and the reference symbols $f_1$, $f_2$ and $f_3$ designate focal lengths of said first, second and third lens components respectively.

3. A wide-angle zoom lens system comprising a front lens group consisting of a first negative lens component having a surface with a small radius of curvature on the image side, a second negative lens component and a third positive lens component, and a rear lens group consisting of a fourth positive lens component, a fifth positive lens component having a surface with a small radius of curvature on the object side, a sixth negative lens component having a surface with a small radius of curvature on the image side and a seventh positive lens component; said zoom lens system being so adapted as to perform the zooming operation by varying the airspace reserved between said front lens group and rear lens group, and having the following numerical data:

| | | | |
|---|---|---|---|
| $r_1 = 40.7425$ | | | |
| | $d_1 = 2.04$ | $n_1 = 1.63854$ | $\nu_1 = 55.4$ |
| $r_2 = 21.204$ | | | |
| | $d_2 = 8.035$ | | |
| $r_3 = -420.9044$ | | | |
| | $d_3 = 1.94$ | $n_2 = 1.63854$ | $\nu_2 = 55.4$ |
| $r_4 = 46.1762$ | | | |
| | $d_4 = 3.921$ | | |
| $r_5 = 34.6606$ | | | |
| | $d_5 = 4.17$ | $n_3 = 1.72342$ | $\nu_3 = 38.0$ |
| $r_6 = 84.0243$ | | | |
| | $d_6 = 36.249 \sim 1.792$ | | |
| $r_7 = 47.5549$ | | | |
| | $d_7 = 6.345$ | $n_4 = 1.6583$ | $\nu_4 = 53.4$ |
| $r_8 = -86.9323$ | | | |
| | $d_8 = 1.38$ | | |
| $r_9 = 24.9887$ | | | |
| | $d_9 = 3.521$ | $n_5 = 1.6583$ | $\nu_5 = 53.4$ |
| $r_{10} = 97.9338$ | | | |
| | $d_{10} = 3.835$ | | |
| $r_{11} = -77.1075$ | | | |
| | $d_{11} = 6.447$ | $n_6 = 1.80518$ | $\nu_6 = 25.4$ |
| $r_{12} = 23.2424$ | | | |
| | $d_{12} = 3.108$ | | |
| $r_{13} = -693.5659$ | | | |
| | $d_{13} = 2.845$ | $n_7 = 1.64769$ | $\nu_7 = 33.8$ |
| $r_{14} = -28.6171$ | | | |

$f = 36.0 \sim 68.5$
$f_M = -63.0$
$f_1 = -72.182$ $\quad |f_1/f_M| = 1.146$
$f_2 = -65.061$ $\quad |f_2/f_M| = 1.033$
$f_3 = 78.761$ $\quad |f_3/f_M| = 1.250$
$r_9/f_w = 0.694$
$r_{12}/f_w = 0.646$
$r_7/r_9 = 1.903$
$f_u = 41.500,$ $f_4 = 47.586,$ $f_5 = 50.005$
$f_7 = 46.007,$ $f_{45} = 25.206,$ $f_5/f_4 = 1.051$
$f_{45}/f_7 = 0.548,$ $f_7/f_u = 1.109,$ $r_1/f_w = 1.132$
$r_4/f_w = 1.283,$ $r_5/f_w + 0.963,$ $d_4/f_4 = 0.109$ -continued $(d_{10} + d_{12})/f_w = 0.193$ wherein the reference symbols $r_1$ through $r_{14}$ represent radii of curvature on the surfaces of the respective lens elements, the reference symbols $d_1$ through $d_{13}$ designate thicknesses of the respective lens elements and airspaces reserved therebetween, the reference symbols $n_1$ through $n_7$ denote refractive indices of the respective lens elements, the reference symbols $\nu_1$ through $\nu_7$ represent Abbe's numbers of the respective lens elements, the reference symbol f designates focal length of the zoom lens system as a whole, the reference symbol $f_M$ represents focal length of said front lens group, and the reference symbols $f_1$, $f_2$ and $f_3$ designate focal lengths of said first, second and third lens components respectively.

4. A wide-angle zoom lens system comprising a front lens group consisting of a first negative lens component having a surface with a small radius of curvature on the image side, a second negative lens component and a third positive lens component, and a rear lens group consisting of a fourth positive lens component, a fifth positive lens component having a surface with a small radius of curvature on the object side, a sixth negative lens component having a surface with a small radius of curvature on the image side and a seventh positive lens component, said zoom lens system being so adapted as to perform the zooming operation by varying the airspace reserved between said front lens group and rear lens group, and having the following numerical data:

$r_1 = 43.7155$
$r_2 = 23.0467$
$r_3 = 583.0754$
$r_4 = 37.4587$
$r_5 = 32.383$
$r_6 = 74.6168$
$r_7 = 52.9675$
$r_8 = -127.281$
$r_9 = 23.6257$
$r_{10} = 10.5906$
$r_{11} = -81.9425$
$r_{12} = 21.7018$
$r_{13} = 196.271$
$r_{14} = -28.1096$ $d_1 = 2.24$   $n_1 = 1.6228$   $\nu_1 = 57.1$
$d_2 = 8.014$
$d_3 = 2.14$   $n_2 = 1.6228$   $\nu_2 = 57.1$
$d_4 = 4.698$
$d_5 = 4.23$   $n_3 = 1.6398$   $\nu_3 = 34.5$
$d_6 = 36.743 \sim 0.599$
$d_7 = 3.498$   $n_4 = 1.691$   $\nu_4 = 54.8$
$d_8 = 0.202$
$d_9 = 3.652$   $n_5 = 1.641$   $\nu_5 = 56.9$
$d_{10} = 5.191$
$d_{11} = 2.989$   $n_6 = 1.80518$   $\nu_6 = 25.4$
$d_{12} = 5.257$
$d_{13} = 4.241$   $n_7 = 1.60342$   $\nu_7 = 38.0$ $f = 36.0 \sim 68.0$
$f_M = -64.038$
$f_1 = -81.664$   $|f_1/f_M| = 1.275$
$f_2 = -64.372$   $|f_2/f_M| = 1.005$
$f_3 = 86.06$   $|f_3/f_M| = 1.344$
$r_9/f_w = 0.656$
$r_{12}/f_w = 0.603$
$r_7/r_9 = 2.242$
$f_u = 43.177$,   $f_4 = 54.651$,   $f_5 = 46.632$
$f_7 = 41.040$,   $f_{45} = 25.406$,   $f_5/f_4 = 0.855$
$f_{45}/f_7 = 0.619$,   $f_7/f_u = 0.951$,   $r_1/f_w = 1.214$
$r_4/f_w = 1.041$,   $f_5/f_w = 0.900$   $d_4/f_w = 0.131$
$(d_{10} + d_{12})/f_w = 0.290$ wherein the reference symbols $r_1$ through $r_{14}$ represent radii of curvature on the surfaces of the respective lens elements, the reference symbols $d_1$ through $d_{13}$ designate thicknesses of the respective lens elements and airspaces reserved therebetween, the reference symbols $n_1$ through $n_7$ denote refractive indices of the respective lens elements, the reference symbols $\nu_1$ through $\nu_7$ represent Abbe's numbers of the respective lens elements, the reference symbol f designates focal length of the zoom lens system as a whole, the reference symbol $f_M$ represents focal length of said front lens group, and the reference symbols $f_1$, $f_2$ and $f_3$ designate focal lengths of said first, second and third lens components respectively.

5. A wide-angle zoom lens system comprising a front lens group consisting of a first negative lens component having a surface with a small radius of curvature on the image side, a second negative lens component and a third positive lens component, and a rear lens group consisting of a fourth positive lens component, a fifth positive lens component having a surface with a small radius of curvature on the object side, a sixth negative lens component having a surface with a small radius of curvature on the image side and a seventh positive lens component, said zoom lens system being so adapted as to perform the zooming operation by varying the airspace reserved between said front lens group and rear lens group, and having the following numerical data:

$r_1 = 45.2632$
$r_2 = 23.6043$
$r_3 = 373.8232$
$r_4 = 35.669$
$r_5 = 32.1537$
$r_6 = 72.9747$
$r_7 = 42.6462$
$r_8 = -155.773$
$r_9 = 25.6664$
$r_{10} = 161.4985$
$r_{11} = -75.8712$
$r_{12} = 21.7747$
$r_{13} = 340.309$
$r_{14} = -28.7092$ $d_1 = 2.24$   $n_1 = 1.6228$   $\nu_1 = 57.1$
$d_2 = 8.01$
$d_3 = 2.14$   $n_2 = 1.6228$   $\nu_2 = 57.1$
$d_4 = 4.763$
$d_5 = 4.23$   $n_3 = 1.64769$   $\nu_3 = 33.8$
$d_6 = 36.911 \sim 0.767$
$d_7 = 3.441$   $n_4 = 1.6583$   $\nu_4 = 53.4$
$d_8 = 0.152$
$d_9 = 3.65$   $n_5 = 1.6583$   $\nu_5 = 53.4$
$d_{10} = 4.267$
$d_{11} = 4.204$   $n_6 = 1.80518$   $\nu_6 = 25.4$
$d_{12} = 5.598$
$d_{13} = 3.877$   $n_7 = 1.62606$   $\nu_7 = 39.1$ $f = 36.0 \sim 68.0$
$f_M = -64.038$
$f_1 = -82.479$   $|f_1/f_M| = 1.288$
$f_2 = -63.467$   $|f_2/f_M| = 0.991$
$f_3 = 85.273$   $|f_3/f_M| = 1.332$
$r_9/f_w = 0.713$
$r_{12}/f_w = 0.605$
$r_7/r_9 = 1.662$
$f_u = 43.178$,   $f_4 = 51.211$,   $f_5 = 45.867$
$f_7 = 42.461$,   $f_{45} = 24.545$,   $f_5/f_4 = 0.896$
$f_{45}/f_7 = 0.578$,   $f_7/f_u = 0.983$,   $r_1/f_w = 1.257$
$r_4/f_w = 0.991$,   $r_5/f_w = 0.893$,   $d_4/f_w = 0.132$
$(d_{10} + d_{12})/f_w = 0.274$ wherein the reference symbols $r_1$ through $r_{14}$ represent radii of curvature on the surfaces of the respective lens elements, the reference symbols $d_1$ through $d_{13}$ designate thicknesses of the respective lens elements and airspaces reserved therebetween, the reference symbols $n_1$ through $n_7$ denote refractive indices of the respective lens elements, the reference symbols $\nu_1$ through $\nu_7$ represent Abbe's numbers of the respective lens elements, the reference symbol f designates focal length of the zoom lens system as a whole, the reference symbol $f_M$ represents focal length of said front lens group, and the reference symbols $f_1$, $f_2$ and $f_3$ designate focal lengths of said first, second and third lens components respectively.

6. A wide-angle zoom lens system comprising a front lens group consisting of a first negative lens component having a surface with a small radius of curvature on the image side, a second negative lens component and a third positive lens component, and a rear lens group consisting of a fourth positive lens component, a fifth positive lens component having a surface with a small radius of curvature on the object side, a sixth negative lens component having a surface with a small radius of curvature on the image side and a seventh positive lens component, said zoom lens system being so adapted as to perform the zooming operation by varying the airspace reserved between said front lens group and rear lens group, and having the following numerical data:

$r_1 = 47.226$
  $d_1 = 2.1$   $n_1 = 1.6228$   $\nu_1 = 57.1$
$r_2 = 22.7022$
  $d_2 = 7.878$
$r_3 = -456.3736$
  $d_3 = 2$   $n_2 = 1.6228$   $\nu_2 = 57.1$
$r_4 = 40.3657$
  $d_4 = 3.944$
$r_5 = 35.5408$
  $d_5 = 4.17$   $n_3 = 1.72342$   $\nu_3 = 38.0$
$r_6 = 104.6907$
  $d_6 = 35.706 \sim 0.052$
$r_7 = 52.7644$
  $d_7 = 6.343$   $n_4 = 1.6583$   $\nu_4 = 57.3$ -continued $r_8 = -102.0611$
  $d_8 = 2.009$
$r_9 = 26.2833$
  $d_9 = 3.63$   $n_5 = 1.6583$   $\nu_5 = 57.3$
$r_{10} = 107.5007$
  $d_{10} = 3.93$
$r_{11} = -73.0658$
  $d_{11} = 6.64$   $n_6 = 1.80518$   $\nu_6 = 25.4$
$r_{12} = 25.2538$
  $d_{12} = 3.394$
$r_{13} = 318.6274$
  $d_{13} = 3.282$   $n_7 = 1.64760$   $\nu_7 = 33.8$
$r_{14} = -28.9424$ $f = 36.0 \sim 68.5$
$f_M = -63.0$
$f_1 = -72.581$   $|f_1/f_M| = 1.152$
$f_2 = -59.455$   $|f_2/f_M| = 0.944$
$f_3 = 72.543$   $|f_3/f_M| = 1.151$
$r_9/f_w = 0.73$
$r_{12}/f_w = 0.701$
$r_7/r_9 = 2.008$ $f_u = 42.941$,   $f_4 = 53.710$,   $f_5 = 51.925$
$f_7 = 41.117$,   $f_{45} = 27.407$,   $f_5/f_4 = 0.967$
$f_{45}/f_7 = 0.667$,   $f_7/f_u = 0.958$,   $r_1/f_w = 1.312$
$r_4/f_w = 1.121$,   $r_5/f_w = 0.987$,   $d_4/f_w = 0.110$
$(d_{10} + d_{12})/f_w = 0.204$ wherein the reference symbols $r_1$ through $r_{14}$ represent radii of curvature on the surfaces of the respective lens elements, the reference symbols $d_1$ through $d_{13}$ designate thicknesses of the respective lens elements and airspaces reserved therebetween, the reference symbols $n_1$ through $n_7$ denotes refractive indices of the respective lens elements, the reference symbols $\nu_1$ through $\nu_7$ represent Abbe's numbers of the respective lens elements, the reference symbol f designates focal length of the zoom lens system as a whole, the reference symbol $f_M$ represents focal length of said front lens group, and the reference symbols $f_1$, $f_2$ and $f_3$ designate focal lengths of said first, second and third lens components respectively.

* * * * *